(12) United States Patent
Galante et al.

(10) Patent No.: US 7,007,876 B2
(45) Date of Patent: Mar. 7, 2006

(54) PASTRY BLENDER AND COOKED FRUIT AND VEGETABLE MASHER

(76) Inventors: Gregory B. Galante, 3280 Old Coach Road, Burlington, Ontario (CA) L7N 3P7; Robert G. Dickie, 15 Valley Trail, Newmarket, Ontario (CA) L3Y 4V8

( * ) Notice: Subject to any disclaimer, the term of this patent is extended or adjusted under 35 U.S.C. 154(b) by 151 days.

(21) Appl. No.: 10/456,545

(22) Filed: Jun. 9, 2003

(65) Prior Publication Data
US 2004/0188555 A1    Sep. 30, 2004

Related U.S. Application Data

(63) Continuation-in-part of application No. 29/178,309, filed on Mar. 26, 2003, now abandoned.

(51) Int. Cl.
*B02C 19/08*    (2006.01)

(52) U.S. Cl. ................................... 241/169.2

(58) Field of Classification Search .................. 30/117, 30/305; 99/452; 366/129; 241/169.2
See application file for complete search history.

(56) References Cited

U.S. PATENT DOCUMENTS

| 920,484 | A | 5/1909 | Marchand |
| 1,232,356 | A | 7/1917 | Markee et al. |
| 1,373,843 | A | 4/1921 | Sundberg |
| 1,447,499 | A | 3/1923 | Walter |
| 1,645,062 | A | 10/1927 | Lambert |
| 1,720,361 | A | 7/1929 | Harris |
| 1,859,958 | A | 5/1932 | Cessna, Jr. |
| 2,091,754 | A | 8/1937 | Fedje |
| 3,865,317 | A | 2/1975 | Brehm |
| D442,823 | S | 5/2001 | Wright |
| 2002/0181320 | A1 | 12/2002 | King et al. |

FOREIGN PATENT DOCUMENTS

| GB | 553 409 A | 5/1943 |
| GB | 555 793 A | 9/1943 |

*Primary Examiner*—Mark Rosenbaum
(74) *Attorney, Agent, or Firm*—Sand & Sebolt

(57) ABSTRACT

A pastry blender or cooked fruit and vegetable masher has a base portion, a side portion, and a handle member, and is such that the handle is separated from the base portion. The base portion has a pair of edge frame members and a plurality of cutter wire members which extend between them in spaced parallel relation one to another, and which are rigidly secured to the edge frame members. The spacing between the cutter wire members is at least five times the greatest horizontal width of any one cutter wire member.

20 Claims, 4 Drawing Sheets

PASTRY BLENDER AND COOKED FRUIT AND VEGETABLE MASHER

REFERENCE TO APPLICATION

This application is a Continuation-In-Part of application Ser. No. 29/178,309 filed Mar. 26, 2003 now abandoned.

FIELD OF THE INVENTION

This invention relates to kitchen utensils, and particularly relates to devices that may be employed as pastry blenders or as mashers for cooked fruit and vegetables.

BACKGROUND OF THE INVENTION

Typically, there have been different tools or kitchen utensils that have been provided in the past for the purposes of a pastry blender or, as it is sometimes known, a pastry cutter, and as a masher for cooked fruits and vegetables. The general purposes and uses of utensils for differing purposes, as described above, are indeed different, but it has been unexpectedly discovered that by the provision of the novel utensil which comprises in particular a substantially planar base portion, the purposes for pastry blending as well as for mashing cooked fruits and vegetables can be satisfied with the provision of a single tool, or at least a tool which comprises the principal features of the present invention.

Moreover, it has been unexpectedly discovered that a substantially planar base portion of the utensil of the present invention, especially when used as a pastry blender, gives superior results to even one which has slight curvature of the base portion, as illustrated in the parent, co-pending, application.

As will be discussed hereafter, typically pastry blenders or pastry cutters have a horizontally disposed handle, whereas mashers for cooked fruits and vegetables typically have a vertically disposed handle.

In any event, pastry blenders and cooked fruit and vegetable mashers in keeping with the present invention are particularly characterized by or distinguished by the fact that the structure is rigid, with a substantially planar base portion which has a pair of spaced apart edge frame members with a plurality of cutter wire members extending between them in substantially parallel relation one to another and rigidly secured between the edge frame members.

The principal purposes for which the present invention was developed were as a pastry blender or pastry cutter. However, upon noting the effectiveness with which pastry recipes may be assembled with excellent results, in the manner discussed hereafter, it was noted that cooked fruit and vegetables could be mashed using the same or similar device with excellent results as well.

Dietary habits, particularly in the North American and European public, have varied over the years. It is now much more common to request and expect mashed fruits and vegetables such as apple sauce, mashed potatoes, turnips, or carrots, to be served in a so-called textured manner as opposed to being served in an essentially pureed manner. That is, there may be small lumps or particulate and distinguishable portions of the fruit or vegetable being served along with a much finer fruit or vegetable, where the fruit or vegetable is not said to be lumpy but is acceptable and desired as a textured food.

Typically, when cooked fruits or vegetables are to be mashed, it is a simple matter of a continued vertical cutting action of a masher as it passes down through the food product, with continuous reduction of the size of the particles. Most mashers have wide, horizontally disposed blades, and the consequence of their action against the cooked food product is to essentially pulverize that food product so as to mash or puree the same. A typical shortcoming of all such vegetable mashers is, however, that the upward motion tends to collect considerable quantities of the fruit or vegetable being mashed, so that it must be discharged from the masher by tapping the tool against the edge of the bowl or sauce pan, or otherwise dislodging the food by using the finger or a spoon.

Moreover, in the art of making pastry, considerably more skill and dexterity is required. Many unskilled persons who attempt to make pastry as pie crust or even tea biscuit batter and the like, tend to overwork the pastry, which results in a tough pastry that neither rises nor is flaky.

The three principal ingredients of pastry are fat such as butter, shortening, lard, or mixtures thereof, together with flour, and liquid such as milk or water. It is well known that the best pastry is made using cold ingredients—that is, the shortening, butter, or lard should be removed directly from the refrigerator just prior to making the pastry. However, when that occurs, then obviously the fat component is hard, and typically it must be diced or cubed prior to being worked into the flour, such as by cutting it with a knife. Even that process results in an uneven and tough pastry.

Many pastry blenders have been brought to the market over the years, as described hereafter, but they all suffer from one or more of the following shortcomings: they are ineffective at cutting hard fat, they have insufficient structural strength and rigidity, so that they change their shape; clumped pastry tends to collect on the upper side of the tines or blades of the pastry blender and must continually be dislodged; and an uneven or irregular cutting and blending effect will occur.

A skilled pastry chef will, when blending pastry, press downwardly and at the same time rotate the utensil that he or she is using so as to ensure that the blending effect of the fat component and the flour occurs. The pastry chef does not want the fat component to be broken down into particles that are too small, because the flakiness of the pastry will be adversely effected. At the same time, the pastry chef does not want to overwork the flour so as to unduly stretch the gluten in the flour, resulting in a tough pastry. Thus, several considerations in the design of a pastry blender are that it must be rigid and capable of a torque action placed upon it as it is twisted into the mix of fat and flour—typically, the liquid component is not added at the beginning of the pastry blending process—because especially at the beginning of the process there can be considerable resistance by the hard fat against the pastry blender tool.

Another issue that arises is that with prior art pastry blenders, an uneven cutting and blending action occurs. This is a particular consequence of the downwardly curved configuration of most pastry blenders, where a greater cutting force and action occurs at the centre of the blender and very little cutting action against the fat occurs at the edges of the pastry blender. Moreover, the very shape of such pastry blenders results in an unwanted build up of fat component on the tines or wires of the pastry blender, which continually have to be dislodged.

The lack of rigidity of most pastry blenders, and their inability to withstand significant forces either downwardly or in torque, also results in uneven cutting and blending actions. Moreover, the shape of the bowl in which pastry is to be blended, or the bowl or sauce pan in which a cooked fruit or vegetable is to be mashed, is essentially immaterial.

Bowls and sauce pans typically have curved sides or they may have straight sides, with a flat bottom or at least a portion of the bottom being flat. Nonetheless, kitchen utensils in keeping with the present invention effectively serve their purpose in any bowl or sauce pan.

DESCRIPTION OF THE PRIOR ART

The configuration of a typical pastry blender is shown in U.S. Design Pat. D 442,823. While that patent is especially directed at the shape of the handle of the pastry blender, the shape of the wire or tines will be understood from that patent.

Indeed, U.S. Pat. No. 1,645,062 issued Oct. 11, 1927 to Lambert specifically teaches a pastry blender or mixer having a plurality of curved semi-circular cutter wires or mixers.

A somewhat similar device is shown in Fedje U.S. Pat. No. 2,091,754, issued Aug. 31, 1937.

A mixing device having an essentially flat head is shown in Harris U.S. Pat. No. 1,720,361, issued Jul. 9, 1929. However, this patent requires that there shall be a plurality of mixing or agitating members formed of strips of sheet metal, which must be braced or stiffened with a centrally located bracing bar placed perpendicularly to the sheet metal strips.

Another mixing tool which comprises a plurality of straight wires which, however, are arranged in a circular arc, is shown in Cessna U.S. Pat. No. 1,859,958 issued May 24, 1932.

A dough mixer having a plurality of broad bars or slots that are stamped out of sheet metal, and then shaped or formed into a semi-circular form so that the blades extend angularly inwardly and downwardly, is shown in Marchand U.S. Pat. No. 920,484, issued May 24, 1909.

A butter mixer having angled blades that are also stamped from sheet metal is shown in U.S. Pat. No. 1,232,356 issued to Markee et al on Jul. 3, 1917.

SUMMARY OF THE INVENTION

In order to overcome the obvious shortcomings of the prior art, particularly as discussed above, the present invention provides a pastry blender and cooked fruit and vegetable masher which comprises a base portion, a side portion, and a handle member.

The side portion comprises a pair of opposed side support elements which extend vertically away from the base portion and terminate in the handle member at one end there of, and in a pair of spaced apart edge frame members at the other end thereof. Thus, the handle member and the base portion are vertically spaced apart one from the other.

The base portion comprises the pair of spaced apart edge frame members and a plurality of cutter wire members which extend therebetween in spaced parallel relation one to another. The spacing between adjacent pairs of cutter wire members is at least five times more than the greatest horizontal width of any one of the cutter wire members.

The cutter wire members are rigidly secured between the side edge frame members.

Finally, the cutter wire members are substantially coplanar one with another.

In a particular embodiment of the present invention, the opposed side support elements each comprise a vertically diverted upper portion and an angularly downwardly directed lower portion which terminates at its lowest extremity at one end of a respective one of the spaced apart edge frame members.

In this embodiment, the lower portion of each one of the pair of opposed side support elements extends in an opposite direction the other one of the pair of opposed side support elements.

In any embodiment of the present invention, the placement of the cutter wire members may be such that they are secured in a plane below the plane of the edge frame members; alternatively, the cutter wire members may be secured in the same plane as that of the edge frame members.

Typically, the edge frame members are arcuately curved outwardly.

Any embodiment of the blender and masher utensil of the present invention may further comprise a reinforcing bar which is disposed in a plane parallel to the plane of the cutter wire members and disposed closer to the handle member than to the base portion.

When the utensil of the present invention is intended to be utilized as a pastry blender, then typically the handle is disposed in a plane parallel to that of the cutter wire members.

However, particularly if the utensil of the present invention is intended to be used as a masher for cooked fruit and vegetables, the handle may be disposed in a plane vertical to that of the cutter wire members.

It has been found to be effective that the greatest horizontal width of any one of the cutter wire members may be in the range of 0.04 inches to 0.07 inches.

The cross-sectional profile of the cutter wire members may be round, square, diamond shape, triangular, oblong, or combinations thereof.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

A first, typical, configuration of a pastry blender, in its principal purpose, is shown in FIGS. 1 to 5. Here, the pastry blender 10 is shown to comprise a base portion 12, a side portion 14, and a handle member 16.

Figure 1:
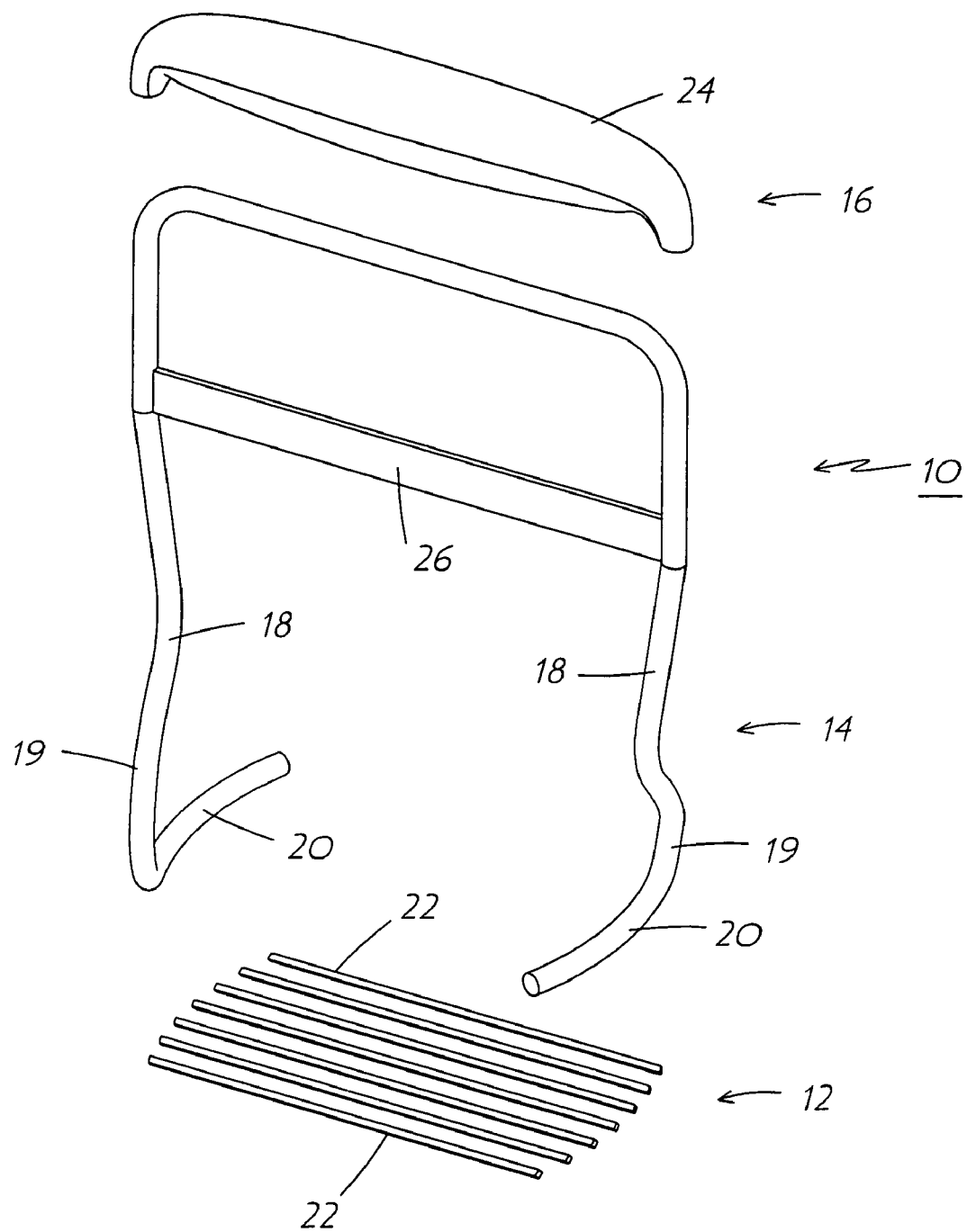
FIG. 1 is a perspective, exploded view of a typical pastry blender or cooked fruit and vegetable masher, showing the principal components thereof in an exploded form.

In the embodiment of FIG. 1, the side portion 14 comprises a pair of opposed side support elements 18 which extend generally vertically away from the base portion 12. It will be seen that the side support elements 18 are terminated at their upper end at the handle member 16, and at their lower end at a pair of spaced apart edge frame members 20. Thus, the handle member 16 and base portion 12 are vertically spaced apart one from the other.

Figure 3:
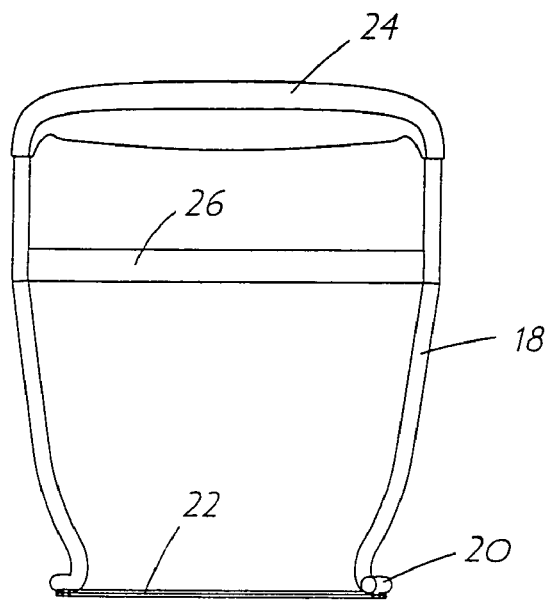
FIG. 3 is an elevation view from the left face thereof of an assembled utensil in keeping with the embodiment of FIG. 1.
Figure 4:
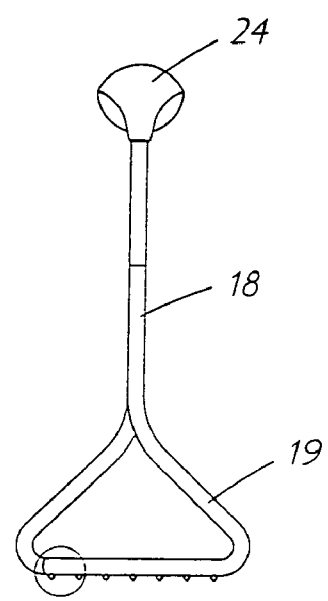
FIG. 4 is an end view of an assembled utensil in keeping with the embodiment of FIG. 1, from the right end thereof.
Figure 5:
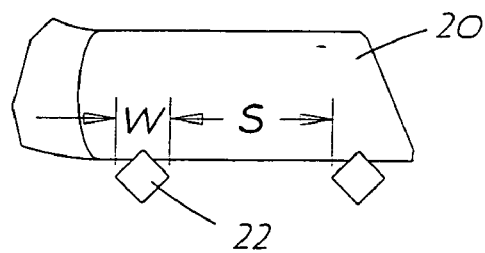
FIG. 5 is an enlarged view of a portion of the base portion as indicated in FIG. 4.

As is evident in each of FIGS. 1 to 5, the base portion 12 comprises a pair of spaced apart edge frame members 20, and a plurality of cutter wire members 22 which extend between the edge frame members 20 in spaced parallel relation one to another. Each of the cutter wire members 22 has a greatest horizontal width w, as seen in FIG. 5, and as can be understood by reference to any of FIGS. 7 to 11, showing various cross-sectional configurations 22a, 22b, 22c, 22d, 22e, respectively, for the cutter wire members 22. In any event, it will be understood that the spacing s between adjacent pairs of cutter wire members 22 is at least five times more than the greatest horizontal width w of any one of the cutter wire members 22.

It is important to note, as well, that the cutter wire members 22 are rigidly secured between the edge frame members 20.

Moreover, it is also important to note that the cutter wire members 22 are substantially co-planar one with another.

In keeping with a particular feature of the present invention, and as a consequence of the manner in which pastry blenders and cooked fruit and vegetable mashers in keeping with the present invention may be manufactured, the rigidity of the cutter wire members 22 as they are secured in place between the edge frame members 20 may be assured by placing the cutter wire members 22 in tension. The manner in which that effect can be achieved is described hereafter.

A particular feature of the embodiment of FIGS. 1 to 5 will now be described. As noted above, there is an unwanted buildup of clumped pastry or other material being blended or mashed with prior art pastry blenders and fruit and vegetable mashers. However, the inventors herein have unexpectedly further discovered that, especially with pastry blenders, that buildup can be substantially alleviated by providing an embodiment such as that shown in FIGS. 1 to 5.

Here, it will be seen that there is a particular configuration to each of the side support elements 18, such that each comprises an angularly downwardly directed lower portion D which subtends a vertically directed upper portion. It will be seen particularly from FIGS. 1, 2, and 3, that each of the lower portions 19 terminates at its lowest extremity at one end of the respective left or right (as seen in FIGS. 1 and 2, for example) one of the spaced apart edge frame members 20.

However, it will also be noted that each lower portion 19 extends in the opposite direction to the direction that the other one of the lower portions 19 extends. Thus, a rigid frame for the pastry blender 10 is provided, even though it is found only at one or the other of the front or back edges of the base portion 12 at either side thereof.

It has been noted above that typically a skilled pastry chef will import a twisting action to the pastry blender as he or she is making pastry. Moreover, it has been noted that whether or not the pastry chef is right-handed, he or she will tend to import a clockwise twisting action to the pastry blender as it is pushed downwardly into the pastry blend.

Figure 2:
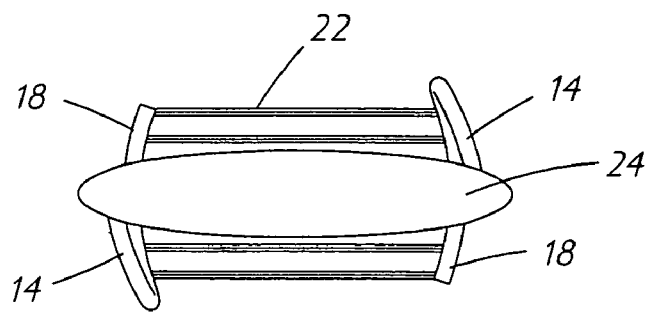
FIG. 2 is a plan view from above, of an assembled embodiment in keeping with FIG. 1.

Accordingly, atypical embodiment of the pastry blender in keeping with the embodiment of FIGS. 1 to 5 will have the rightmost lower portion 19, as seen in FIGS. 1 to 3, sloped rearwardly downwardly, while the leftmost lower portion 19 slopes forwardly and downwardly. This arrangement further tends to alleviate clumping and unwanted excessive buildup of material above the cutter wires 22.

The lower portions 19 may also slope inwardly to some extent, as seen in FIG. 3. This accommodates a wider handle portion 24 to suit larger hand sizes of male pastry chefs.

Figure 6:
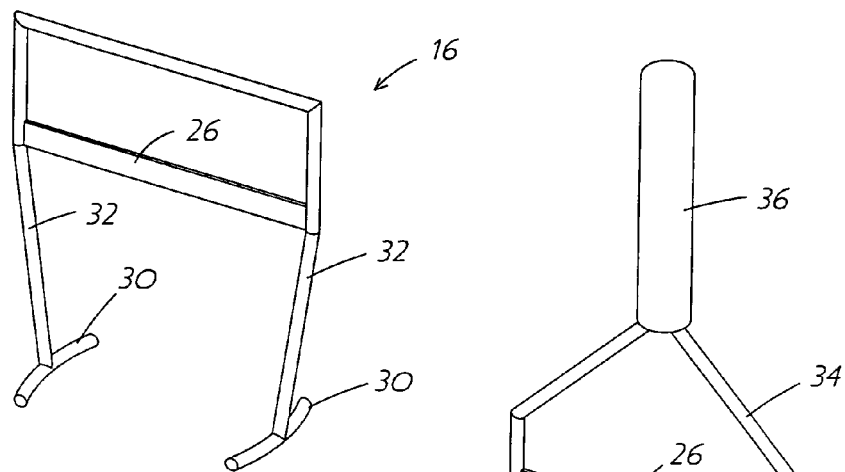
FIG. 6 is a perspective view of a typical assembly of principal structural members in keeping with another embodiment of the present invention, but without the cutter wire members being in place.

A further embodiment of the kitchen utensil of the present invention is shown in FIG. 6, and it will be understood that a handle member 24 such as that which is shown in FIG. 1 may easily be attached as well to the frame of the embodiment of FIG. 4. That frame comprises a pair of edge frame members 30 which subtend a pair of opposed side support elements 32. Here, the side support elements 32 intersect the edge frame members 30 in a more conventional, central location of each.

Figure 7:
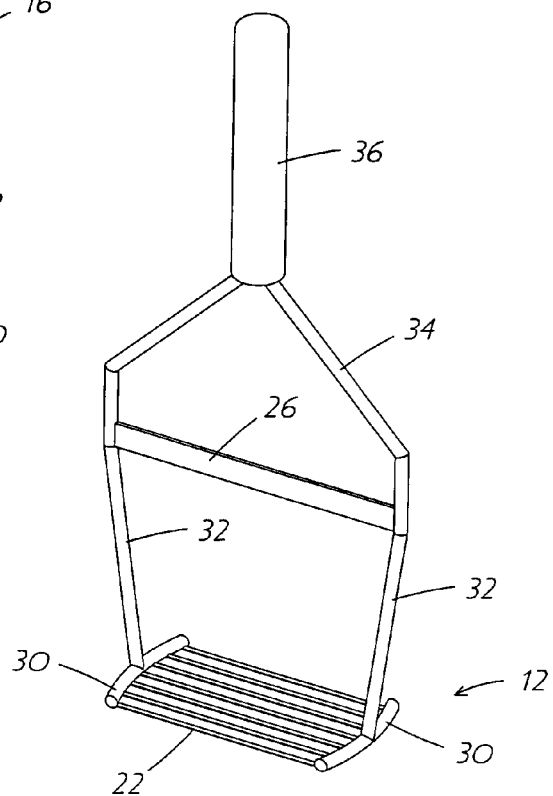
FIG. 7 shows a further embodiment similar to that of FIG. 4, of a utensil in keeping with the present invention when configured as a fruit and vegetable masher.

A variation of the embodiment to FIG. 6 is shown in FIG. 7, where the cutter wire members 22 have been secured in place between the edge frame members 30, and wherein the opposed side support members 32 merge into shoulders 34 that terminate in a vertically disposed handle member 36. It will be understood that the embodiment of FIG. 7 is particularly intended to function as a fruit and vegetable masher, since it is more difficult to impart a twisting or torque action against the base portion 12 of that embodiment then of the embodiments of FIG. 1 or 6, due to the disposition of the handle member.

Figure 8:
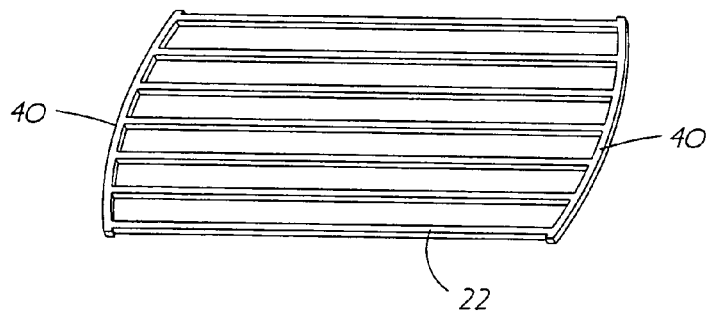
FIG. 8 is a perspective view of the cutter wire members and side frame members of the base portion of a further embodiment of the present invention, when formed integrally one with another.

It will also be understood from FIG. 8 that the base portion 12 of any embodiment of pastry blender or fruit and vegetable masher in keeping with the present invention may be integrally formed, such as by molding or stamping. Here, it is seen that the cutter wire members 22 extend between opposed and spaced apart edge frame members 40. In this case, the cutter wire members 22 and the edge frame members 40 are coplanar one with another; whereas in the other embodiments that are illustrated the cutter wire members 22 are coplanar but in a plane which is below the plane of the respective frame members 20, 30.

Typically, so as to accommodate the round nature of nearly every bowl or sauce pan with which the pastry blender or cooked fruit and vegetable masher in keeping with the present invention will be used, the spaced apart edge frame members 20, 30, 40 are arcuately curved outwardly. Such a configuration also assists in mitigating against unwanted build up of material above the cutter wire members 22.

A reinforcing bar 26 may be disposed in a plane which is parallel to the plane of the cutter wire members 22, and is typically placed closer to the handle member 16 than to the base portion 12.

As noted, typically when a utensil in keeping with the present invention is configured as a pastry blender, it will adopt a configuration such as any of those shown in FIGS. 1 to 6; and when configured as a cooked fruit or vegetable masher, it may adopt a configuration such as that shown in FIG. 7. This is not to say that the details of the construction will be specifically as illustrated; rather, it is to demonstrate that the handle portion 16 may be horizontally or vertically disposed. The reason is that, when the handle is horizontally disposed, a turning or torque motion can be easily imparted by the hand of the user to the utensil 10, and then to the pastry being blended; whereas by adopting a configuration such as that shown in FIG. 7, the hand of the user can be spaced higher and further away from a hot fruit or vegetable to be mashed, and so as to avoid contact of the hand and the knuckles thereof with the hot fruit or vegetable being mashed.

Various cross-sectional configurations of the cutter wire members 22 may be employed, as may various sizes of cutter wire members. However, it has not been found to be particularly effective for the cutter wire members 22 to be flat, but they may be square as shown in FIG. 8, particularly when the utensil is to be configured as a food and vegetable masher.

It is also been found to be effective that the greatest cross-sectional or horizontal width of any one of the cutter wire members should typically be in the range of from 0.04 inches to 0.07 inches.

Figure 9:
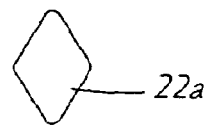
FIGS. 9, 10, 11, 12, and 13, show typical cross-sectional profiles of cutter wire members that may be employed in keeping with the present invention.
Figure 10:
Figure 11:
Figure 12:
Figure 13:

FIGS. 9 to 13 suggest various cross-sectional configurations, such as diamond shapes as shown in FIG. 9 and 10 at 22a and 22b; triangular or modified triangular shapes as shown in FIGS. 11 and 12 at 22c and 22d; round as shown in FIG. 13 at 22e; or square as understood from FIG. 8.

It is particularly important to note that the cutter wire members 22 must be rigidly secured between respective edge frame members 20, 30, 40. This may typically be achieved by such manufacturing steps as soldering or welding, although such steps are beyond the scope of the present invention. However, it is also noted that the rigidity of the cutter wire members 22 when secured in place between the respective edge frame members 20, 30, 40, can be enhanced by placing the cutter wire members 22 in tension.

This can be achieved by one of several techniques. For example, the wire material from which the cutter wire members 22 are to be formed may be heated prior to or as they are being secured to the respective edge frame members 20, 30, 40, so that when they cool down they attempt to shorten their length and are therefore placed in tension.

Alternatively, the opposed side support elements 18, 32, may be forced inwardly to an extent that does not exceed their modulus of elasticity, and thus their elastic memory, before the cutter wire members 22 are secured in place. Afterwards, the side support elements 18, 32, are released, so as to attempt to regain their initial configuration, thereby causing tension to occur within the cutter wire elements 22.

It will be understood that by having sufficient spacing between adjacent pairs of cutter wire members, there is less propensity for the material being blended or mashed to collect above the cutter wire members, and if in any event it is much easier to clear that material away, if necessary, simply by pushing it back down through the spaces between the cutter wire members using the fingers or a spoon or spatula.

The advantages of use of the utensil of the present invention, particularly as a pastry blender, are profound. For example, it has been demonstrated that a typical pastry recipe which employs one pound of hard butter, shortening, or lard, that has been taken directly from the refrigerator, can be satisfactorily blended so as to make a flaky pastry, when baked, in less than sixty seconds. Tests using the same starting materials and comparing a pastry blender such as those disclosed in the Wright or Lambert patents noted above with a pastry blender in keeping with the present invention were made. Using a pastry blender in keeping with the present invention consistently resulted in a satisfactory or excellent pastry being blended in less than sixty seconds. However, only satisfactory, acceptable, or tough, pastry resulted after using the prior art pastry blenders for upwards of 15 minutes. As is well known to any pastry chef or pastry afficionado, pastry that is overworked, will be less flaky, and it will be tough.

Indeed, it follows that a pastry blender of the present invention provides the best results when used with a hard, cold, fat component for the pastry blender because of the excellent fat cutting action that can be obtained. Thus, the wishes for an excellent pastry blender that is prepared using cold fat and cold liquid components are clearly satisfied; and use of the cold fat components is recommended. This is completely contrary to any prior art pastry blender.

The embodiments illustrated, and the other features of pastry blenders and cooked fruit and vegetable blenders, the shape and configuration of pastry blender or cooked fruit and vegetable masher utensils in the keeping with the present invention. Such utensils may be manufactured using a variety of different techniques, including metal working and stamping, welding and soldering, injection moulding, and so on, without departing from the spirit and scope of the present invention.

Other modifications and alterations may be used in the design and manufacture of the apparatus of the present invention without departing from the spirit and scope of the accompanying claims.

Moreover, the word "substantially" when used with an adjective or adverb is intended to enhance the scope of the particular characteristic; e.g., substantially planar is intended to mean planar, nearly planar and/or exhibiting characteristics associated with a planar element.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A pastry blender and cooked fruit and vegetable masher comprising a base portion, a side portion, and a handle member; wherein said side portion comprises a pair of opposed side support elements extending vertically away from said base portion and terminating in said handle member at one end thereof and in a pair of spaced apart edge frame members at the other end thereof, so that said handle member and said base portion are vertically spaced apart one from the other; wherein said base portion comprises said pair of spaced apart edge frame members and at least four plurality of cutter wire members extending therebetween in spaced parallel relation one to another, where the spacing between adjacent pairs of cutter wire members is at least five times more than the greatest horizontal width of any one of said cutter wire members, and where the length of each cutter wire it at least seven times the spacing between adjacent pairs of cutter wire members; wherein said cutter wire members are rigidly secured between said edge frame members; and wherein said cutter wire members are substantially coplanar one with another.

2. The blender and masher of claim 1, wherein each one of said pair of opposed side support elements comprises a vertically directed upper portion and an angularly downwardly directed lower portion which terminates at its lowest extremity at one end of a respective one of said spaced apart edge frame members; and wherein the lower portion of each one of said pair of opposed side support elements extends in an opposite direction to the other one of said pair of opposed side support elements.

3. The blender and masher of claim 2, wherein said cutter wire members are held in tension between said edge frame members.

4. The blender and masher of claim 2, wherein said cutter wire members are secured in a plane below that of said edge frame members.

5. The blender and masher of claim 2, wherein said cutter wire members are secured in the same place as that of said edge frame members.

6. The blender and masher of claim 2, wherein said edge frame members are arcuately curved outwardly.

7. The blender and masher of claim 2, further comprising a reinforcing bar disposed in a plane parallel to the plane of said cutter wire members and disposed closer to said handle member than to said base portion.

8. The blender and masher of claim 2, wherein said handle member is disposed in a plane parallel to that of said cutter wire members.

9. The blender and masher of claim 2, wherein said handle member is disposed in a plane vertical to that of said cutter wire members.

10. The blender and masher of claim 2, wherein the greatest horizontal width of any one of said cutter wire members is in the range of 0.04 to 0.07 inches.

11. The blender and masher of claim 2, wherein the cross-sectional profile of said cutter wire member is chosen from the group consisting of round, square, diamond shaped, triangular, oblong, and combinations thereof.

12. The blender and masher of claim 1, wherein said cutter wire members are held in tension between said edge frame members.

13. The blender and masher of claim 1, wherein said cutter wire members are secured in a plane below that of said edge frame members.

14. The blender and masher of claim 1, wherein said cutter wire members are secured in the same place as that of said edge frame members.

15. The blender and masher of claim 1, wherein said edge frame members are arcuately curved outwardly.

16. The blender and masher of claim 1, further comprising a reinforcing bar disposed in a plane parallel to the plane of said cutter wire members and disposed closer to said handle member than to said base portion.

17. The blender and masher of claim 1, wherein said handle member is disposed in a plane parallel to that of said cutter wire members.

18. The blender and masher of claim 1, wherein said handle member is disposed in a plane vertical to that of said cutter wire members.

19. The blender and masher of claim 1, wherein the greatest horizontal width of any one of said cutter wire members is in the range of 0.04 to 0.07 inches.

20. The blender and masher of claim 1, wherein the cross-sectional profile of said cutter wire member is chosen from the group consisting of round, square, diamond shaped, triangular, oblong, and combinations thereof.

* * * * *